US008684396B1

(12) United States Patent
Hanson

(10) Patent No.: US 8,684,396 B1
(45) Date of Patent: Apr. 1, 2014

(54) FOLDABLE ADJUSTABLE DYNAMIC WHEELCHAIR

(76) Inventor: Wayne H. Hanson, Bozeman, MT (US)

( * ) Notice: Subject to any disclaimer, the term of this patent is extended or adjusted under 35 U.S.C. 154(b) by 146 days.

(21) Appl. No.: 13/136,665

(22) Filed: Aug. 4, 2011

Related U.S. Application Data

(60) Provisional application No. 61/370,768, filed on Aug. 4, 2010.

(51) Int. Cl.
*B62B 7/06* (2006.01)

(52) U.S. Cl.
USPC ........................... 280/650; 280/47.4; 280/642

(58) Field of Classification Search
USPC ........... 280/31, 638, 639, 642, 643, 647, 650, 280/657, 658, 47.38, 47.4
See application file for complete search history.

(56) References Cited

U.S. PATENT DOCUMENTS

| | | | | |
|---|---|---|---|---|
| 5,257,799 | A * | 11/1993 | Cone et al. | 280/642 |
| 5,547,256 | A * | 8/1996 | D'Antuono et al. | 297/377 |
| 5,611,560 | A * | 3/1997 | Thimmig | 280/642 |
| 5,722,682 | A * | 3/1998 | Wang | 280/642 |
| 5,887,935 | A * | 3/1999 | Sack | 296/122 |
| 6,851,700 | B2 * | 2/2005 | Yoshie et al. | 280/642 |
| 7,455,362 | B2 * | 11/2008 | Hanson et al. | 297/363 |
| 7,891,696 | B2 * | 2/2011 | Hanson | 280/647 |
| 8,205,907 | B2 * | 6/2012 | Chicca | 280/642 |
| 8,308,391 | B2 * | 11/2012 | Cheng | 403/98 |
| 8,382,127 | B2 * | 2/2013 | Longenecker et al. | 280/47.4 |

* cited by examiner

*Primary Examiner* — Katy M Ebner
*Assistant Examiner* — Emma K Frick
(74) *Attorney, Agent, or Firm* — Richard C. Conover

(57) ABSTRACT

A foldable adjustable dynamic wheelchair including a seat assembly and a push handle assembly configured to serve as a chair back frame both of which are pivotally connected to a mobility base having a pair of spaced apart front rear wheels and a front wheel. A pair of selector plates each having a pair of valleys at a bottom edge thereof are each mounted to either side of the mobility base. A foot operable actuator member is connected to an over-center assembly for moving a latch bar into a valley on one side of center and for moving the latch bar outside a valley on the other side of center. With the latch bar located in one valley the wheelchair is configured in an upright configuration and when the latch bar is located in the other valley, the wheelchair is configured in an extended position.

3 Claims, 11 Drawing Sheets

FOLDABLE ADJUSTABLE DYNAMIC WHEELCHAIR

This application claims the benefit of provisional application Ser. No. 61/370,768 filed on Aug. 4, 2010.

BACKGROUND OF INVENTION

The present invention relates to a foldable adjustable dynamic wheelchair having an assembly for configuring the wheelchair in a first upright chair mode, a second reclining chair mode, a third dynamic mode and a fourth foldable mode.

Adjustable wheel chairs are known such as shown in U.S. Pat. No. 7,455,362 to Hanson et al. and U.S. Pat. No. 7,891,696 to Hanson. The present invention provides advantages over the known wheelchairs by providing a foot operated actuator for adjusting the wheelchair in the four different modes of operation.

SUMMARY OF INVENTION

The present invention includes a seat assembly and a push handle assembly configured to serve as a chair back frame both of which are pivotally connected to a mobility base having a pair of spaced apart rear wheels and a front wheel. A pair of selector plates are each pivotally mounted to either side of the mobility base, the selector plates having a pair of valleys provided at a bottom edge of the selector plate. A movable latch bar is provided extending between the pair of selector plates and movable from a position within the valley to a position outside the valley. A foot operable actuator member is connected to an over-center assembly for moving the latch bar into a valley on one side of center and for moving the latch bar outside a valley on the other side of center. Each selector plate is further provided with a pair of protuberances on either outer side of the pair of valleys whereby when the latch bar is moved outside the valleys but located between the two protuberances the wheelchair is configured for a dynamic mode where the user can move from an extended position to an upright position in a back and forth motion. Further the over-center assembly can be moved with the latch bar to a position where the latch bar is disengaged from the protuberances and the wheelchair can then be folded into a foldable position.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
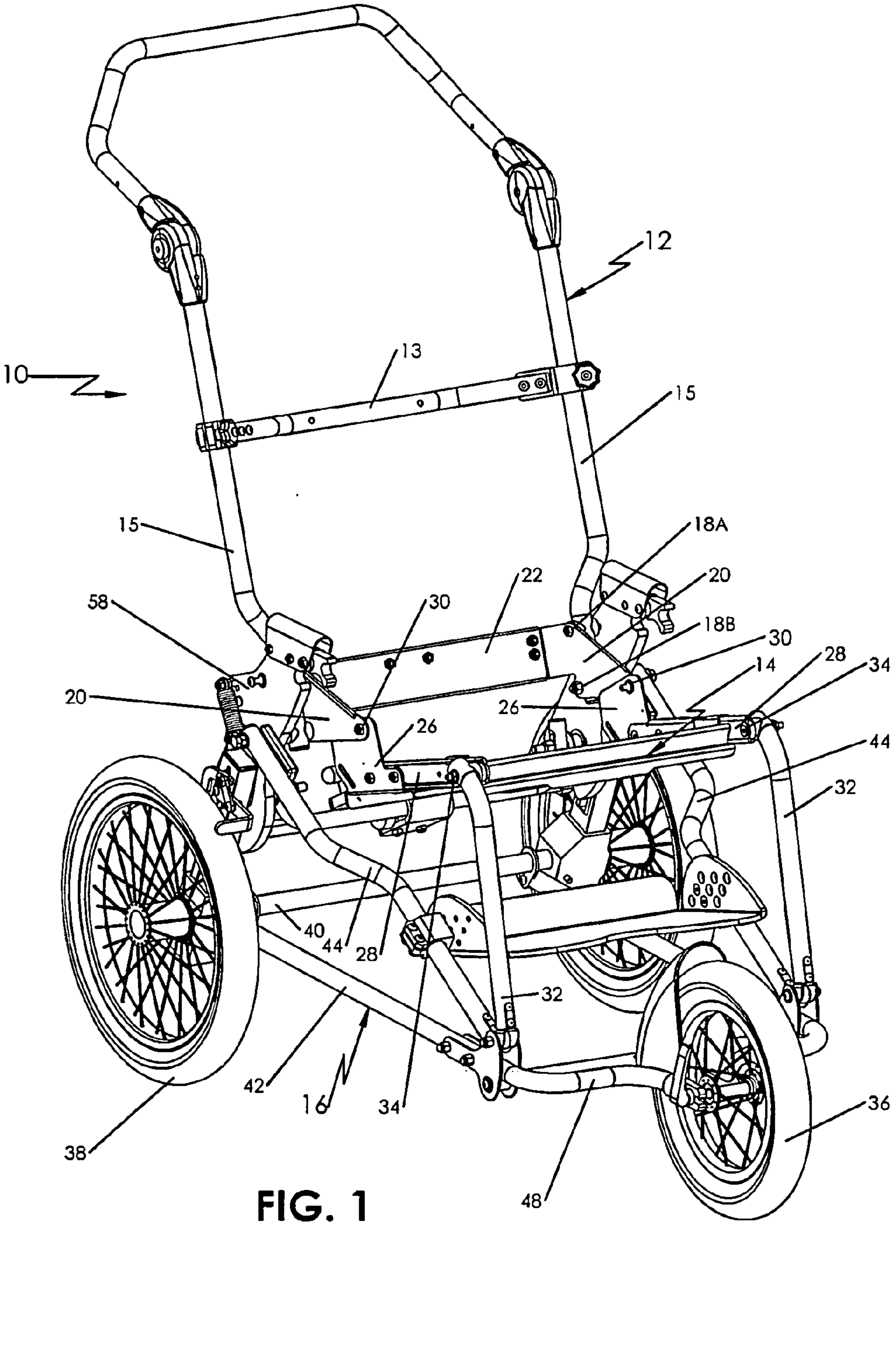
FIG. 1 is a perspective view of a foldable adjustable dynamic chair according to the present invention.
Figure 2:
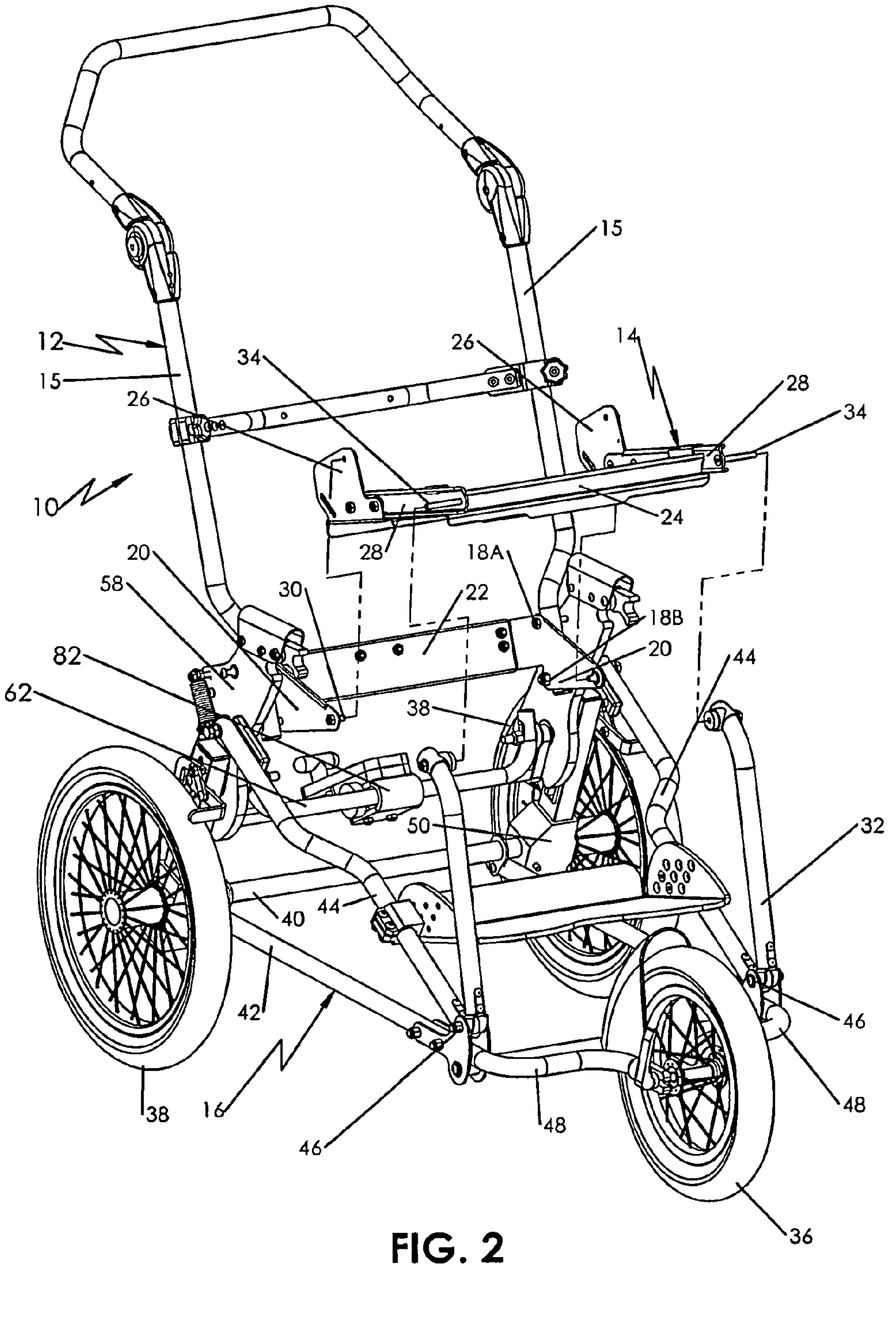
FIG. 2 is an exploded view with parts broken away of the invention shown in FIG. 1.
Figure 7:
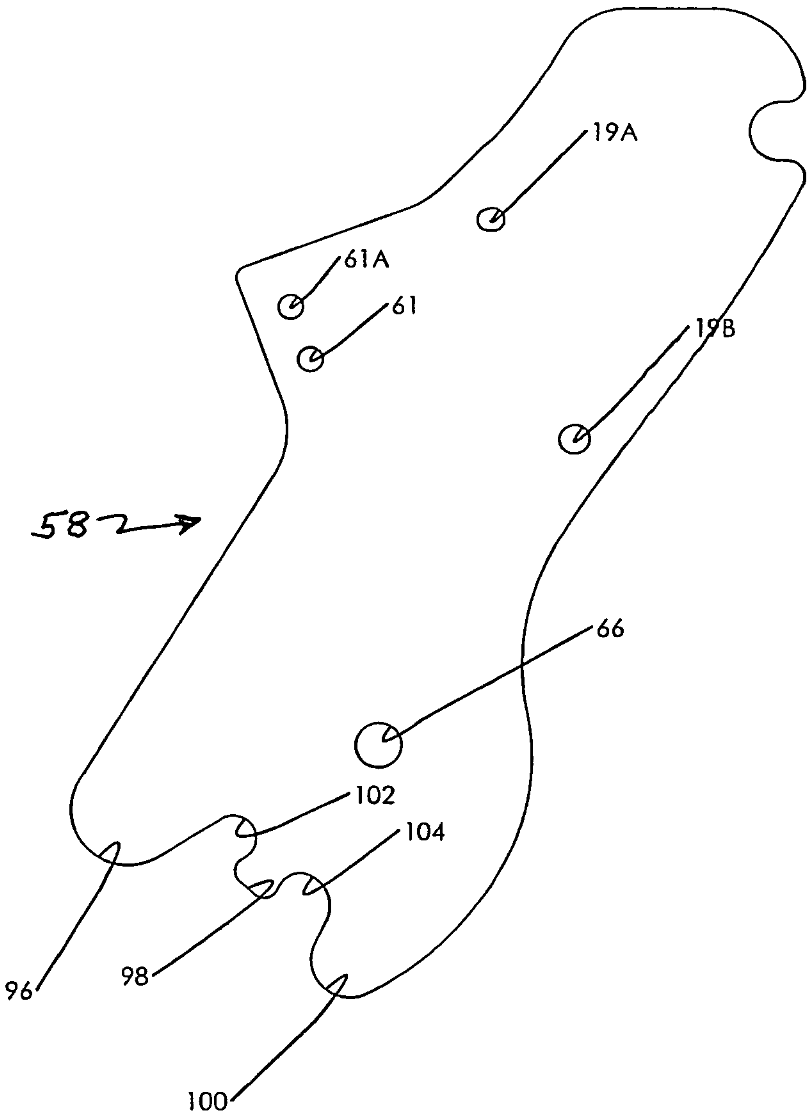
FIG. 7 is a plan view of a selector plate used with the present invention.
Figure 10A:
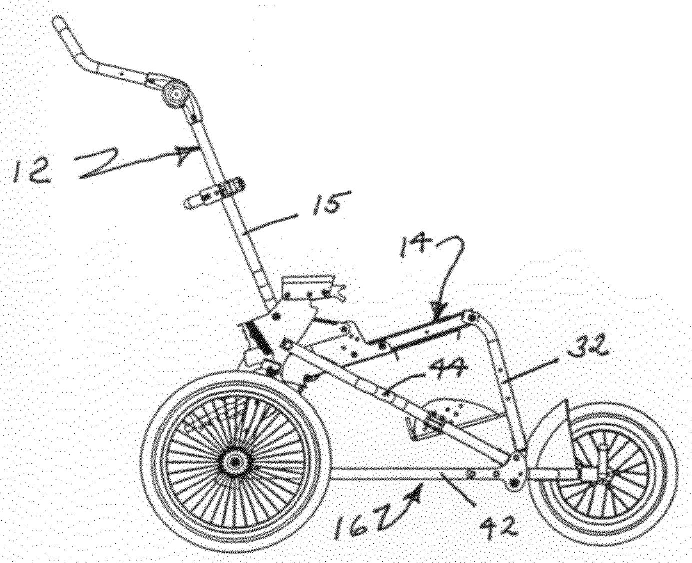
FIG. 10A is a schematic side view of the invention configured in an upright chair mode of operation.
Figure 10B:
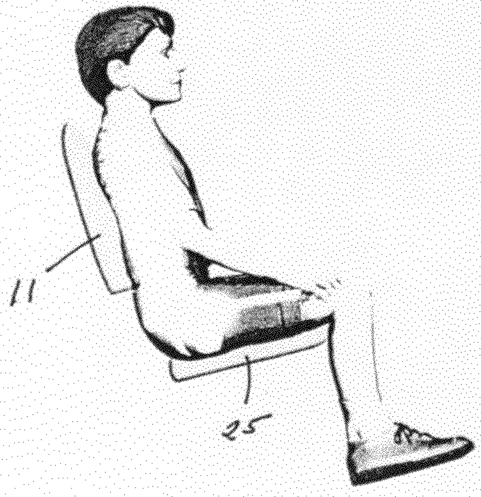
FIG. 10B is a schematic side view of a person sitting with the invention configured as shown in FIG. 10A.
Figure 11A:
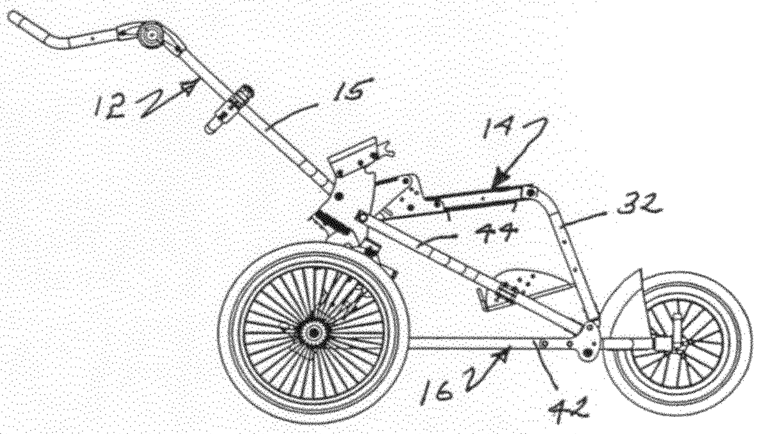
FIG. 11A is a schematic side view of the invention configured in a reclining chair mode of operation.
Figure 11B:
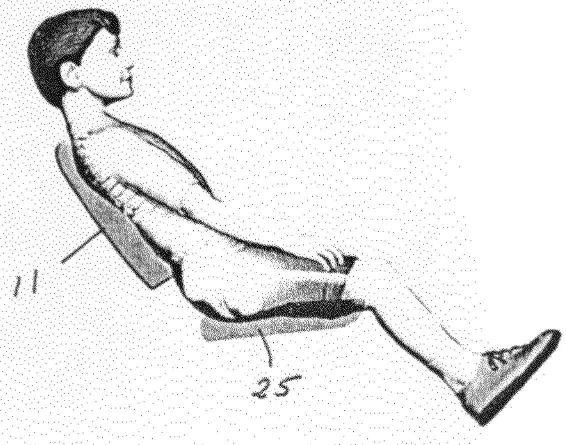
FIG. 11B is a schematic side view of a person sitting with the invention configured as shown in FIG. 11A.

A foldable adjustable dynamic chair 10 is shown in FIG. 1. The chair 10 is comprised of three sections, namely a push handle assembly 12, a seat assembly 14 and a mobility base 16 as shown in FIGS. 1 and 2. The push handle assembly 12 includes a pair of parallel and opposed side frame members 15 and a back cushion support 13 extending between the side frame members 15. The push handle assembly 12 serves as a chair back frame and supports a cushion 11 as shown in FIGS. 10B and 11B. The push handle assembly 12 is secured to the mobility base 16 by mounting the side frame members 15 to the mounting plate 20 and a selector plate 58 with bolts 18A and 18B extending through holes in a mounting plate 20 secured to a seat support frame member 22 as well as through holes 19A and 19B provided in a selector plate 58 as shown in FIG. 7.

The seat assembly 14 includes a seat panel 24 for supporting a cushion 25 (as shown in FIGS. 10B and 11B) and a pair of opposed pivot plates 26 mounted on either side of the seat panel 24. There is also provided a pair of pivot members 28 extending forwardly along the lateral edges of the seat panel 24. The seat assembly 14 is pivotally mounted to the mobility base 16 by mounting pivot plates 26 to mounting plates 20 with pivot bolts 30 extending through holes provided in the pivot plates 26 and mounting plates 20 and also mounting the pivot members 28 to forward struts 32 with pivot bolts 34.

Figure 3:
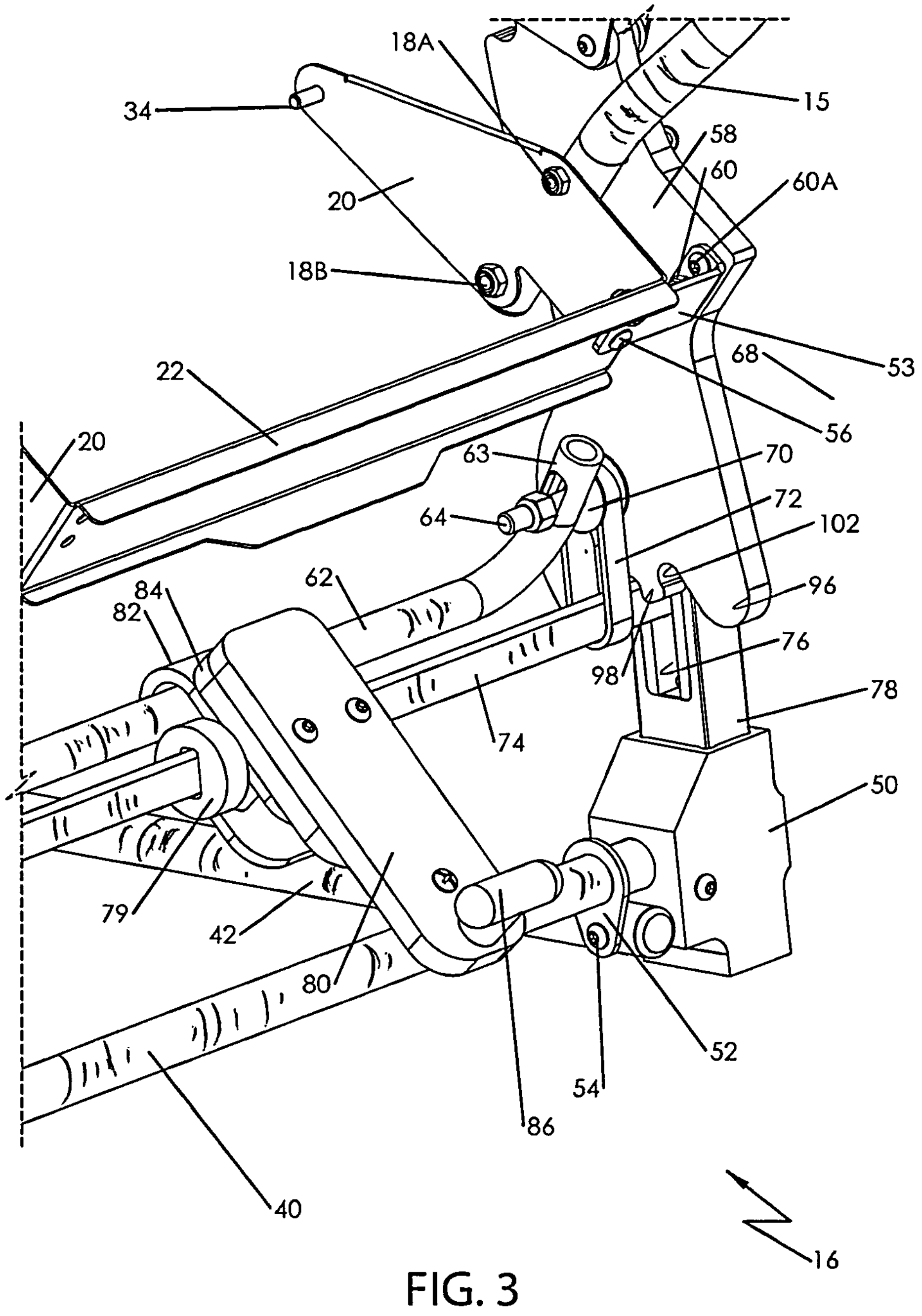
FIG. 3 is a detail perspective view with parts broken away showing structure used to configure the invention in an upright chair mode of operation.

The mobility base 16 further includes a front wheel 36 and a pair of rear wheels 38 rotatably mounted on an axle 40. The axle 40 extends between and through an axle bearing block 50 located on each side of the mobility base 16 as shown in FIGS. 1 and 3. A pair of bottom struts 42 are each connected to a forward axle strut 48 supporting the axle of the forward wheel 36. The distal ends of the struts 42 are provided with a hole for pivotally receiving the bolts 54. A pair of pivot brackets 52 are each connected to the axle 40 immediately inside a respective bearing blocks 50. Each pivot bracket 52 has a hole therethrough for slidably receiving the axle 40. At an opposite end of each pivot bracket 52 another hole is provided for slidably receiving a bolt 54 which is slidably secured to a respective bottom strut 42.

The seat support frame member 22 is mounted to a bracket 53 with bolts 56 as shown in FIG. 3. The bracket 53 is then in turn bolted to a selector plate 58 through holes 61 and 61A (shown in FIG. 7) with bolts 60 and 60A. A selector plate 58 is provided on each side of the seat support frame member 22 and the seat support frame 22 is connected to each of the selector plates 58 in the same manner.

The selector plate 58 allows a user to configure the seat and back of the foldable adjustable dynamic chair 10 into one of four modes of operation. There is a first upright chair mode, a second reclining chair mode, a third dynamic mode allowing the seat and back to pivot forwardly and backwardly and also a fourth foldable position where the entire chair 10 is folded. The selector mechanism enabling a user to select which configuration is desired will now be described.

A tube 62 having bent ends 63 is secured to the selector plate 58 with bolts 64 extending through slots 68 provided in the bent ends 63 and holes 68 provided in the selector plate 58 as shown in FIG. 7. A spool 70 is provided on each of the bolts 64 and carries a rubber band tensioning device 72. The rubber band tensioning device 72 is wrapped around a latch bar 74 as shown in FIGS. 3-6. The ends of the latch bar 74 are slidably received in slots 76 provided in upright members 78 attached to the bearing block 50. The rubber band tensioning device 72 resiliently attempts to force the latch bar 74 upwardly toward the tube 62. A pair of cam rollers 79 are mounted on the latch bar 74.

An actuator member 80 is bolted with bolts 83 to a capture member 82 having a spacer member 84 in between. The capture member 82 is sized to slidably receive the tube 62 and latch bar 74. At the bottom of actuator member 80 is provided a foot pedal 86 to enable a user to step on the foot pedal 86 to pivot the actuator member 80 downwardly.

Figure 4:
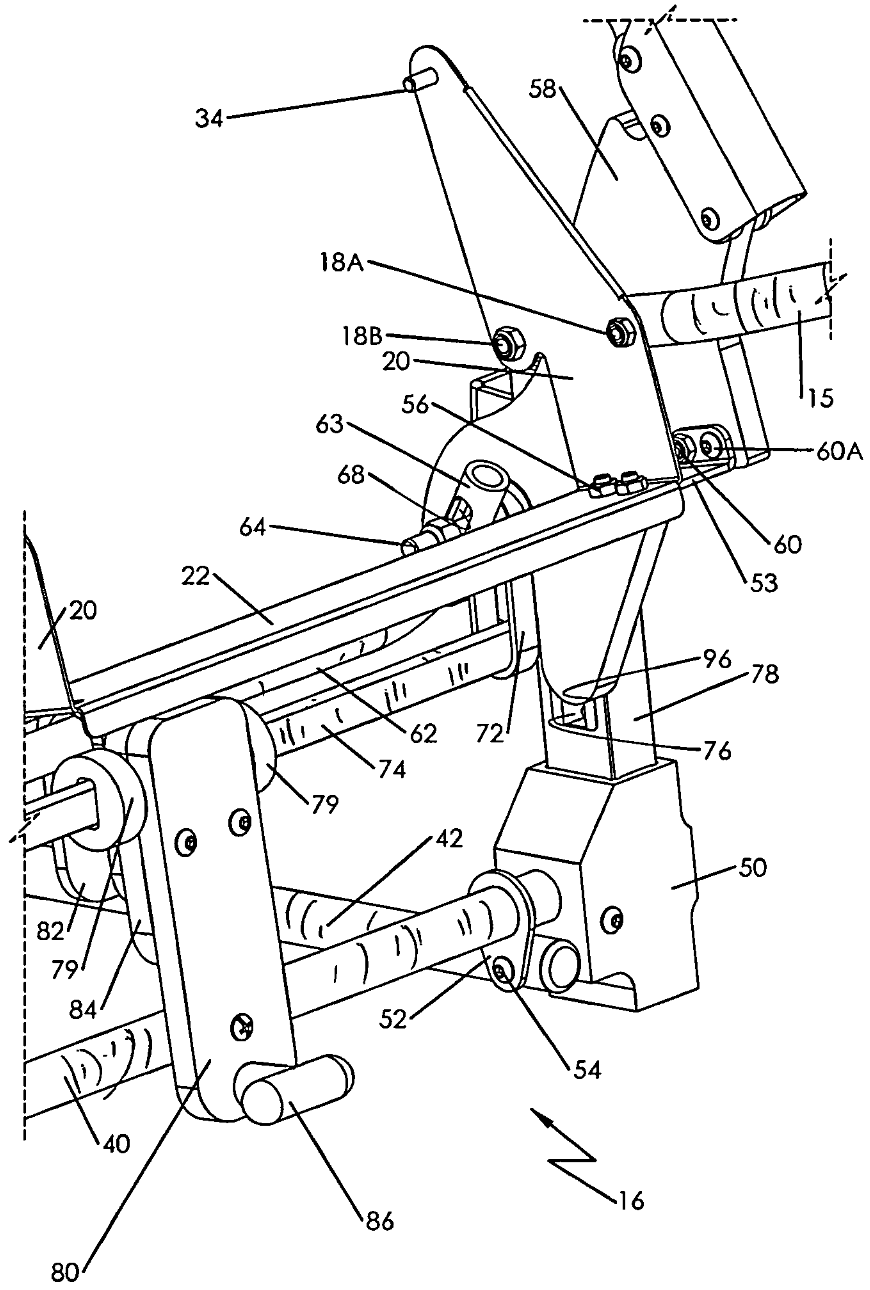
FIG. 4 is a detail perspective view with parts broken away showing structure used to configure the invention in a reclining chair mode of operation.
Figure 5:
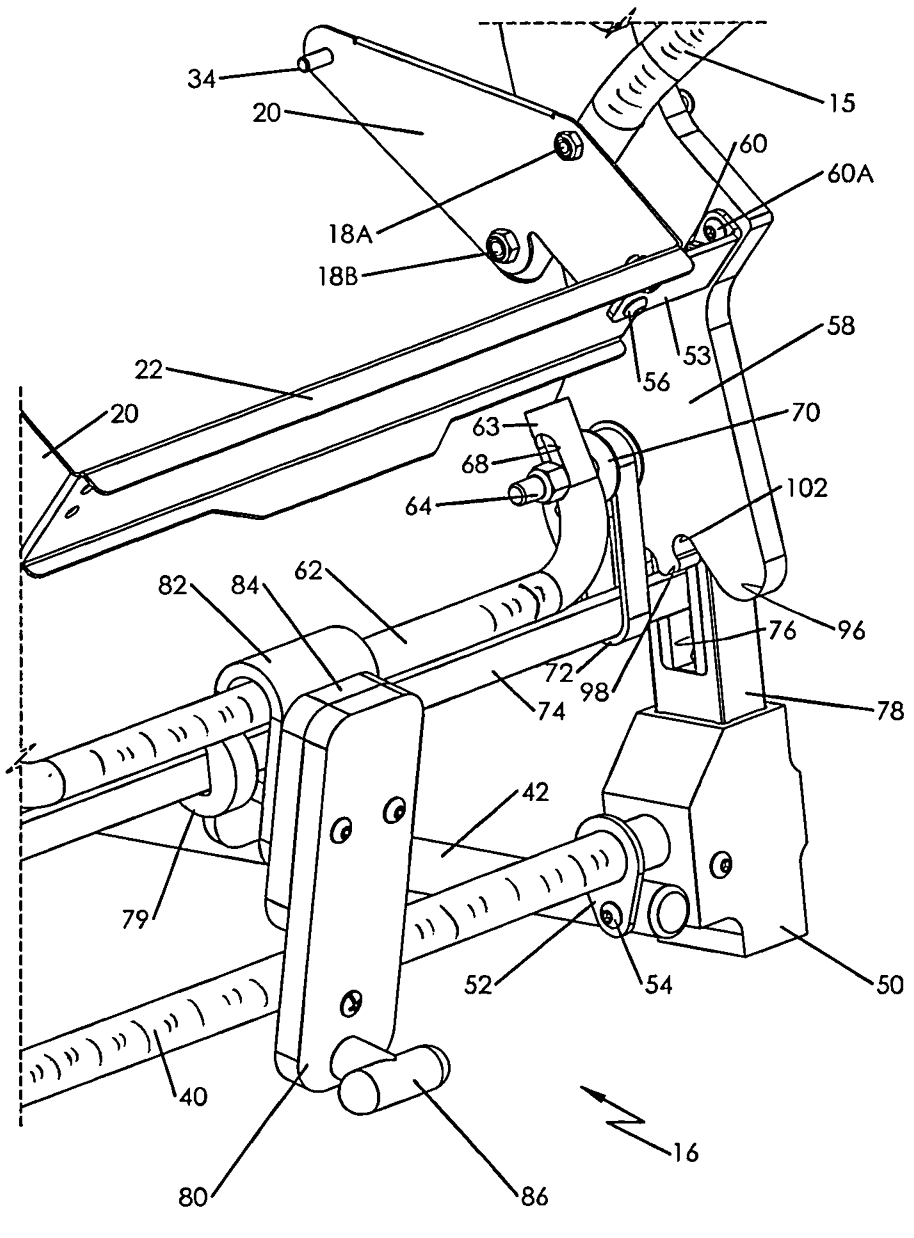
FIG. 5 is a detail perspective view with parts broken away showing structure used to configure the invention in a dynamic mode of operation.
Figure 8A:
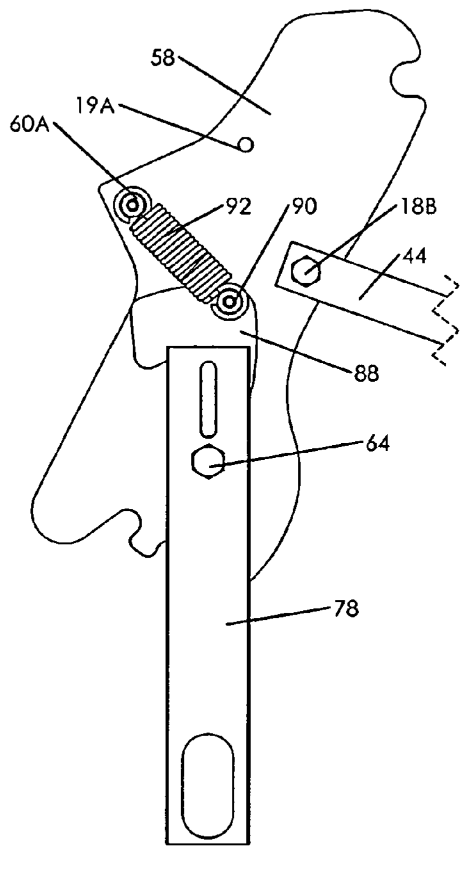
FIG. 8A is a detail plan view of a spring arrangement used when the invention is configured in a dynamic mode of operation with the invention positioned in the upright chair mode.
Figure 8B:
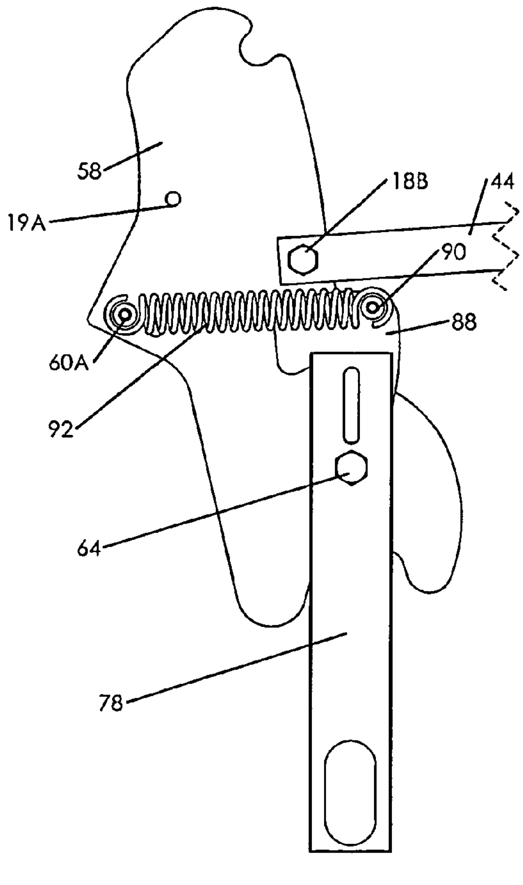
FIG. 8B is a detail plan view of a spring arrangement used when the invention is configured in a dynamic mode of operation with the invention positioned in the reclining chair mode.

As shown in FIGS. 8A and 8B, the rearward end of diagonal strut 44 opposite the pivot bolt 46 is pivotally mounted to bolt 18B shown in FIG. 2. The upright members 78 shown in FIGS. 3-5 are mounted to the selector plate 58 with bolts 64 as shown in FIGS. 3-5 and FIGS. 8A and 8B. The upright members 78 have a spring bracket 88 fixedly secured thereto at an upper end thereof as shown in FIGS. 8A and 8B. The spring bracket 88 has a pin 90 fixedly attached thereto on which a tension spring 92 has one end connected. The other end of spring 92 is connected to an extended portion of bolt 60A as shown in FIGS. 3-5 and FIGS. 8A and 8B.

The selector plate 58 as shown in FIG. 7 includes three protuberances 96, 98 and 100 between which protuberances are two valleys 102 and 104.

In operation, a user depresses with a foot the foot pedal 86 causing the actuator member 80 to rotate downwardly. This action causes the cam rollers 79 to cam against the tube 62 causing the latch bar 74 to move downward in the slots 76 against the resilient force of the rubber band 72 and causing the capture member 82 to move the tube 62 with the bolt 64 riding in slot 68 to an over center position with respect to the bolt 64. This positions the latch bar 74 so that it can be moved relative to the selector plate 58. A user then can pivot the push handle assembly 12 mounted to the mobility base 16 to position the latch bar 74 under either the valley 102 or the valley 104 of the selector plate 58. When the valley is selected the user rotates the actuator member 80 upwardly with a foot causing the capture member 82 to move the tube 62 back over the over center position. The rubber band 72 causes the latch bar 74 to move upwardly into the selected valley. When the latch bar 74 is in the valley 104 as shown in FIG. 3, chair 10 is configured for the upright chair mode as shown in FIGS. 10A and 10B. When the latch bar 74 is in the valley 102 as shown in FIG. 4, the chair 10 is configured for the reclining chair mode as shown in FIGS. 11A and 11B.

In the dynamic mode of operation the user rotates the actuator member 80 downwardly until the tube 62 is moved over center with the latch bar 74 removed from the valleys 102 and 104 as shown in FIG. 5. The user can then freely pivot the chair 10 between the upright chair mode and the reclining chair mode with the latch bar 74 caught between the two protuberance 96 and 110 as shown in FIG. 7. The spring 92 in this configuration resiliently causes the chair 10 to move to the upright chair configuration from the reclining chair position.

Figure 6:
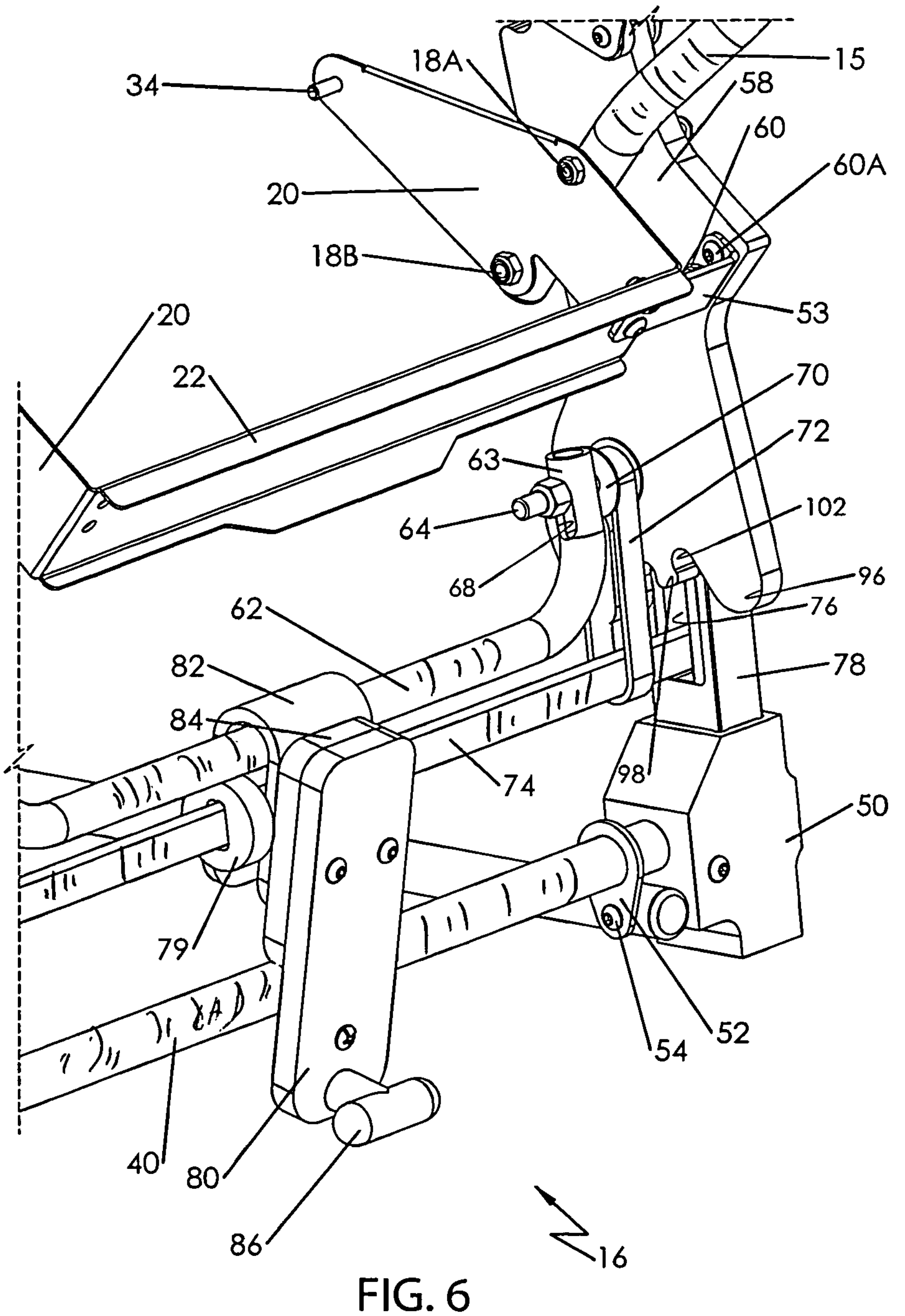
FIG. 6 is a detail perspective view with parts broken away showing structure used to configure the invention in a foldable mode of operation.
Figure 9:
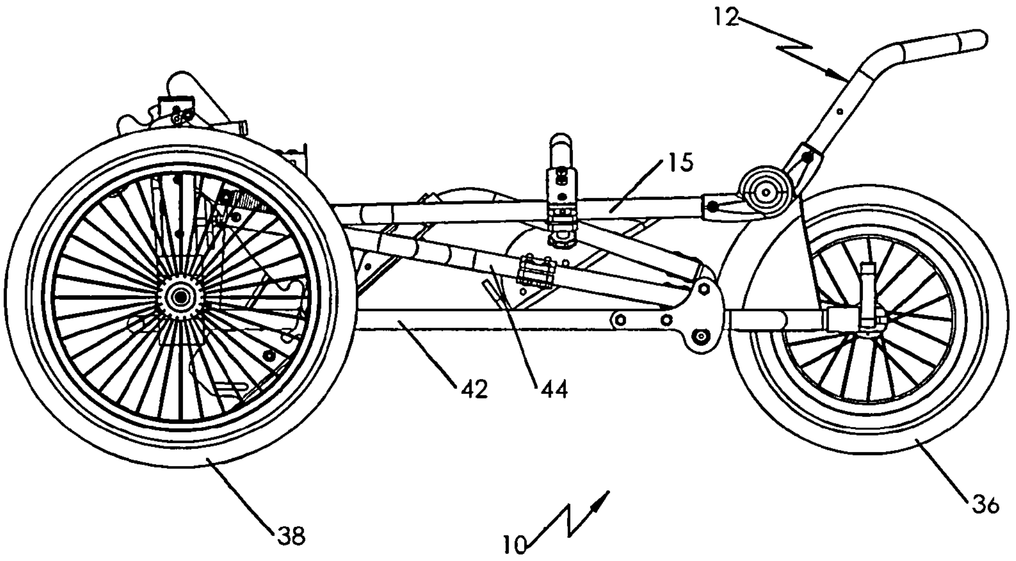
FIG. 9 is an elevational side view of the invention configured in a foldable mode of operation.

When it is desired to configure the chair 10 to a folded configuration, the actuator member 80 is rotated downwardly releasing the latch bar 74 from the valleys 102 or 104. Next a user steps on top of connector 82 moving the tube 62 downwardly in slot 68 and the latch bar 74 downwardly in slot 76 to a position where the latch bar 74 is freed from protuberances 96 and 100 as shown in FIG. 6. The push handle assembly 12 is then rotates forwardly to a position as shown in FIG. 9.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. An adjustable wheelchair comprising:
- a push handle assembly configured to serve as a wheelchair back frame;
- a seat assembly, and
- a mobility base;
- the mobility base having:
  - a rear axle for supporting a pair of spaced apart rear wheels;
  - a front axle for supporting at least one front wheel;
  - a pair of side bottom struts each having an end movably connected to the rear axle and an opposite end fixedly secured to the front axle;
  - a pair of upwardly and rearwardly extending forward struts each having one end pivotally secured to the front axle;
  - a pair of upright members mounted to the rear axle at opposite ends of the axle;
  - a pair of selector plates each pivotally mounted to a respective upright member at an upper end thereof;
  - each selector plate is adjustable and has a pair of valleys provided at a bottom edge thereof;
  - a movable latch bar extending between the pair of selector plates and movable from a position within the valley to a position outside the valley;
  - a resilient means for urging the latch bar into a valley;
  - a foot operable actuator member;
  - an over-center assembly means connected to the actuator member and movable latch bar for moving the latch bar under control of the actuator member into a valley on one side of center with the urging of the resilient means and moving the latch bar under control of the actuator member outside a valley on the other side of center against the urging of the resilient means;
  - means for pivotally moving the pair of selector plates to a position where the latch bar is positioned to enter a selected valley; and
  - a pair of seat mounting plates each of which are fixedly mounted to a respective selector plate;
- the push handle assembly having a pair of parallel and opposed side frame members with each side frame member having an end fixedly mounted to a respective selector plate and fixedly mounted to a respective seat mounting plate;

the seat assembly having a pair of side pivot members each having one end pivotally connected to a respective seat mounting plate and an opposite end pivotally connected to an upper distal end of a respective forward strut;

wherein the wheelchair may be adjusted to select either an upright position where the latch bar is positioned in one valley or an extended position where the latch bar is positioned in the other valley.

2. An adjustable wheelchair according to claim 1 further including a pair of protuberances each protuberance located on opposite outer sides of the pair of valleys and sized to capture the latch bar between the two protuberances when the latch bar is moved below and outside the pair of valleys wherein the wheelchair may be adjusted to allow a user to dynamically move between an upright position to an extended position.

3. An adjustable wheelchair according to claim 2 wherein the over-center assembly and latch bar are adapted to be moved as a unit to a position where the latch bar is located below the two protuberances wherein the wheelchair may be folded.

* * * * *